(12) United States Patent
Horton, Jr. et al.

(10) Patent No.: US 7,688,826 B2
(45) Date of Patent: *Mar. 30, 2010

(54) METHODS TO SUPPRESS AND EXPAND PACKET HEADER INFORMATION IN A WIRELESS COMMUNICATION SYSTEM

(75) Inventors: John D. Horton, Jr., Alpharetta, GA (US); Robert J. Lee, Lawrenceville, GA (US); David M. Pullen, Suwanee, GA (US)

(73) Assignee: Broadcom Corporation, Irvine, CA (US)

(*) Notice: Subject to any disclaimer, the term of this patent is extended or adjusted under 35 U.S.C. 154(b) by 333 days.

This patent is subject to a terminal disclaimer.

(21) Appl. No.: 11/723,687

(22) Filed: Mar. 21, 2007

(65) Prior Publication Data

US 2007/0165631 A1    Jul. 19, 2007

Related U.S. Application Data

(63) Continuation of application No. 10/900,382, filed on Jul. 28, 2004, now Pat. No. 7,433,352, which is a continuation of application No. 09/652,861, filed on Aug. 31, 2000, now Pat. No. 6,788,707.

(60) Provisional application No. 60/151,800, filed on Aug. 31, 1999, provisional application No. 60/151,801, filed on Aug. 31, 1999.

(51) Int. Cl.
*H04L 12/28* (2006.01)

(52) U.S. Cl. ........................ 370/392; 709/247

(58) Field of Classification Search ............... 370/474, 370/389, 471, 470, 351–358, 392, 401, 402, 370/458, 475, 399, 349; 709/247
See application file for complete search history.

(56) References Cited

U.S. PATENT DOCUMENTS 6,438,123 B1 * 8/2002 Chapman ................ 370/351
6,650,624 B1    11/2003 Quigley et al.

(Continued)

FOREIGN PATENT DOCUMENTS

EP        0 806 852        11/1997

OTHER PUBLICATIONS

S. Casner et al., "Compressing IP/UDP/RTP Headers For Low-Speed Serial Links", IETF Draft (draft-ietf-avt-crtp-05.txt), XP-002125101, Jul. 27, 1998, pp. 1-21.
International Search Report For International Application No. PCT/US00/23928, filed Aug. 31, 2000.

(Continued)

*Primary Examiner*—Brenda Pham
(74) *Attorney, Agent, or Firm*—Sterne, Kessler, Goldstein & Fox P.L.L.C.

(57) ABSTRACT

Data packets transmitted over a wireless network are suppressed by hardware at the transmitting end and expanded on the receiving end. This conserves bandwidth as well as reduces the processing resource requirements in both the subscriber station and the base station. An extended header element is added to a data packet that is to be transmitted over the wireless network. The extended header element contains an index that is used along with an identifier to access a rule. The rule is used to determine which bytes are to be suppressed at the transmitter and expanded at the receiver.

22 Claims, 11 Drawing Sheets

U.S. PATENT DOCUMENTS 6,909,715 B1 6/2005 Denney et al.
7,433,352 B2 * 10/2008 Horton et al. ............... 370/389
6,715,075 B1 * 3/2004 Loukianov .................. 713/176
6,788,707 B1 * 9/2004 Horton et al. ............... 370/474

OTHER PUBLICATIONS

Cable Television Laboratories, Inc., "Data-Over-Cable Service Interface Specifications, Radio Frequency Interface Specification, SP-RFIv1.I03-991105", pp. 147-154 (1999).

* cited by examiner

METHODS TO SUPPRESS AND EXPAND PACKET HEADER INFORMATION IN A WIRELESS COMMUNICATION SYSTEM

CROSS-REFERENCE TO RELATED APPLICATIONS

This application is a continuation of U.S. patent application Ser. No. 10/900,382 (now U.S. Pat. No. 7,433,352), filed Jul. 28, 2004, which is a continuation of U.S. patent application Ser. No. 09/652,861 (now U.S. Pat. No. 6,788,707), filed Aug. 31, 2000, which claims the benefit of U.S. Provisional Patent Application No. 60/151,800, filed Aug. 31, 1999, and U.S. Provisional Patent Application No. 60/151,801, filed Aug. 31, 1999. All of these applications are incorporated fully herein by reference as well as the entire contents of U.S. patent application Ser. No. 09/574,558 (now U.S. Pat. No. 6,650,624), filed on May 19, 2000, and U.S. patent application Ser. No. 09/652,718 (now U.S. Pat. No. 6,909,715), filed Aug. 31, 2000.

FIELD OF THE INVENTION

The present invention relates generally to communication systems, and more specifically to a wireless communication system wherein information is communicated between a plurality of subscriber stations and a base station.

BACKGROUND ART

A cable modem network relies on the sharing of a common network media for the transfer of data between the Cable Modem Termination System (CMTS) and multiple Cable Modems (CM). Because this media is shared, both upstream and downstream network bandwidth must be conserved to maintain performance.

The Data Over Cable System Interface Specification (DOCSIS) introduced a concept of Payload Header Suppression (PHS). PHS allows a repetitive portion of certain payload headers to be suppressed by the transmitter and expanded by the receiver, thereby reducing the amount of data transmitted on the cable. This mechanism is implemented by software in first generation CM and CMTS devices, which produces significant processing overhead. This processing overhead serves to limit the number of CMs that can be supported by a single CMTS.

FIG. 1 illustrates a data packet being sent upstream with and without Payload Header Suppression. VoIP illustrates a normal RTP packet carried on an upstream channel. The beginning of the frame represents the physical layer overhead (FGPS) of FEC, guard time, preamble, and stuffing bytes. Stuffing bytes occur in the last code word and when mapping blocks to minislots. Next is the MAC layer overhead including the 6 byte MAC header with a 5 byte BPI Extended Header, the 14 byte Ethernet Header, and the 4 byte Ethernet CRC trailer. The VoIP payload uses a 20 byte IP header, an 8 byte UDP header, and a 12 byte RTP packet header. The voice payload is variable and depends upon the sample time and the compression algorithm used.

FIG. 1 also illustrates the same RTP packet with the Payload Header Suppression occurring in software. In the upstream, Payload Header Suppression begins with the first byte after the MAC Header Checksum. The 14 bytes Ethernet header, the 20 byte IP header, and the 8 byte UDP header have been suppressed, and a 2 byte PHS Extended Header element has been added, for a net reduction of 40 bytes. The suppressed bytes are designated "P" in FIG. 1. In this example of an established VoIP connection, these fields remain constant from packet to packet, and are otherwise redundant.

The detailed description that follows, describes a hardware mechanism which offloads a processing resource from the suppression and expansion duties. This mechanism reduces the processing resource requirements in both a CM and the CMTS, improving overall performance and allowing a larger number of CMs to be serviced by a single CMTS.

BRIEF SUMMARY OF THE INVENTION

According to the invention, a data packet header that is to be transmitted over a wireless network can be suppressed at the transmitting end and expanded on the receiving end to conserve bandwidth on the network. Implementing this process in hardware, as opposed to software, reduces the processing resource requirements in both the subscriber station and the base station.

Rules are used to determine which, if any, bytes are to be suppressed. These rules are determined at the base station and sent to the subscriber station. The subscriber station stores the rules in memory for later retrieval. When the subscriber station receives a data packet, a header parser in the hardware searches for an extended header element. The extended header element contains an index which, together with an identifier, is used to locate the appropriate rule in memory. The identifier defines the type of service flow being used. The service flow is an indicator on where the data packet is directed and the quality of service that has been purchased by the subscriber. When the data packet is to be transmitted over a wireless network, an extended header element is added. The extended header contains an index which, together with the identifier, is used to locate a descriptor stored in memory.

A rule contains three pieces of information needed by hardware to perform payload header expansion: size, mask, and byte string. To simplify hardware accesses to memory, the size and mask are stored in a table together with a pointer to the byte string. Each table entry is a descriptor. The descriptor contains the size field and a mask. The pointer is set to an address in memory where the suppressed bytes are stored. Because the majority of suppressed bytes occur in the first 64 bytes of the payload and to reduce the memory burden at the subscriber station, the first hardware implementation is limited to performing suppression and expansion in the first 64 bytes of the payload. Suppression or expansion of payload header bytes beyond the $64^{th}$ byte and up to 256 bytes is performed in software in the normal way. The hardware implementation can be extended to eliminate this limitation. The value of the size field determines if suppression is to occur in hardware or software. If the size field is greater than 0 and less than or equal to 64, suppression occurs in hardware. The mask is then retrieved from the descriptor and sent to a shift register. The bits in the mask are examined to determine their value. During suppression in the transmitter, if a bit has a value of 1, the corresponding byte is suppressed by being deleted from the data packet and not transmitted. If a bit has a value of 0, the byte is transmitted normally and is not suppressed. Once all the bits of the mask have been examined, the remainder of the data packet is transmitted over the wireless network.

At the receiver, the bytes are reinserted back into the data packet header. This is done by implementing the mask again. Each bit in the mask is examined. If a bit contains a value of 1, the corresponding byte is retrieved from memory and is inserted back into the data packet. If a bit contains a value of 0, the next byte is taken from the bytes transmitted over the wireless network. This process is repeated until all bits of the mask have been examined.

BRIEF DESCRIPTION OF THE DRAWINGS/FIGURES

The features of specific embodiments of the best mode contemplated of carrying out the invention are illustrated in the drawings, in which.

DETAILED DESCRIPTION OF THE INVENTION

Figure 1:
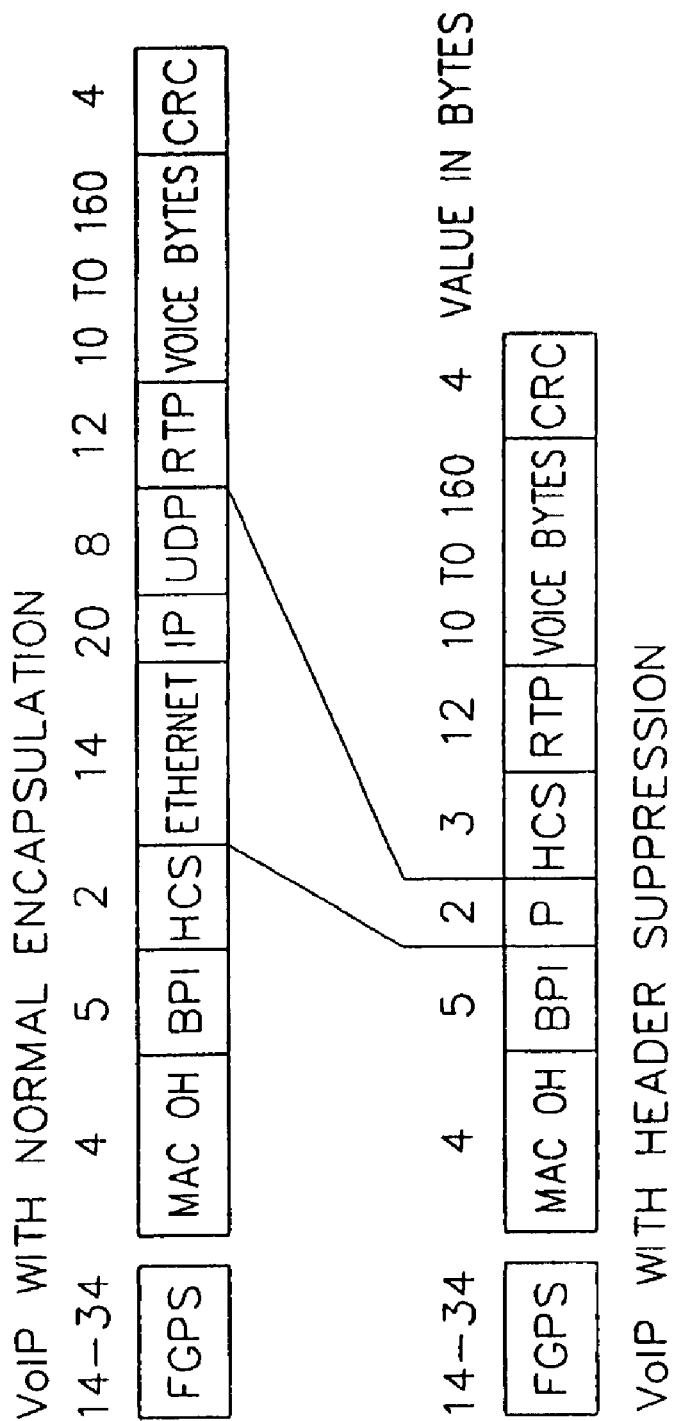
FIG. 1 illustrates how a data packet is conventionally carried on a channel and with Payload Header Suppression occurring in software.

In a cable modem system, a headend or cable modem termination system (CMTS) is located at a cable company facility and functions as a modem which services a large number of subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which effects communication with a plurality of cable modems. A typical cable modem termination system includes a burst receiver, a continuous transmitter and a medium access control (MAC).

The cable modem termination system communicates with the plurality of cable modems via a hybrid fiber coaxial (HFC) network, wherein optical fiber provides communication to a plurality of fiber nodes and each fiber node typically serves approximately 500 to 2,000 subscribers. These subscribers communicate with the node via a shared coaxial cable. It is this sharing of the common coaxial cable which necessitates that the number of cable modems attached thereto be limited so as to mitigate the likelihood of undesirable bit rate reductions which inherently occur when an excessive number of cable modems communicate simultaneously over a single coaxial cable.

The hybrid fiber coaxial network of a cable modem system utilizes a point-to-multipoint topology to carry out communication between the cable modem termination system and the plurality of cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications therefrom to the cable modems and an upstream demodulator for facilitating the reception of data communications from the cable modems.

Typically, the downstream modulator of the cable modem termination system utilizes either 64 QAM or 256 QAM in a frequency band of 54 MHz to 860 MHz to provide a data rate of up to 56 Mbps. Since the upstream channel has a much lower data rate requirement, the upstream demodulator typically uses either QPSK or 16 QAM in a frequency range of 5 MHz to 42 MHz to provide a data rate of up to 10 Mbps.

The asymmetric data throughput defined by the upstream channel requiring a much lower data rate than the downstream channel results from the inherently larger amount of data which is communicated via the downstream channel during pay-per-view, Internet access and the like, wherein a video signal is communicated via the downstream channel, while only control signals such as those associated with viewing of the video signal are communicated via the upstream channel. Thus, the downstream channel requirement may exceed 1.5 Mbps, while the upstream channel requirement may be as low as 16 Kbps.

In the future, it is expected that cable transmission in the upstream direction will become broader band, because digital television transmission requires less bandwidth than analog television transmission.

Each cable modem includes an upstream modulator for facilitating the transmission of data to the cable modem termination system and a downstream demodulator for receiving data from the cable modem termination system. The upstream modulator of each cable modem uses either QPSK or 16 QAM within the 5 MHz to 42 MHz bandwidth of the upstream demodulator and the downstream demodulator of each cable modem utilizes either 64 QAM or 256 QAM in the 54 MHz to 860 MHz bandwidth of the downstream modulator (in North America).

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single cable modem termination system on a given upstream channel.

In order to accomplish TDMA for upstream communication, it is necessary to assign time slots within which cable modems having a message to send to the cable modem termination system are allowed to transmit. The assignment of such time slots is accomplished by providing a request contention area in the upstream data path within which the cable modems are permitted to contend in order to place a message which requests additional time in the upstream data path for the transmission of their message. (Small data packets are sometimes also transmitted in contention regions.) The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system must use a burst receiver, rather than a continuous receiver, to receive data packets from cable modems via upstream communications. As those skilled in the art will appreciate, a continuous receiver can only be utilized where generally continuous communications (as opposed to burst communications as in the present invention) are performed, so as to substantially maintain timing synchronization between the transmitter and the receiver, as is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems require periodic and frequent reacquisition of the signal. That is, during TDMA communications, the signal must be reacquired for each separate burst transmission being received.

Since continuous receivers generally only acquire the signal once, the need to minimize acquisition time is much less critical in continuous receivers than in burst receivers, wherein acquisition must be performed for each separate burst, and therefore occurs quite frequently. Thus, there is a strong motivation to minimize acquisition time in burst receivers, so as to enhance overall data transmission efficiency and throughput. As such, it is beneficial to provide techniques which enhance the speed at which data packets transmitted according to TDMA methodologies may be acquired by a burst receiver, such as that of a cable modem termination system.

Figure 2:
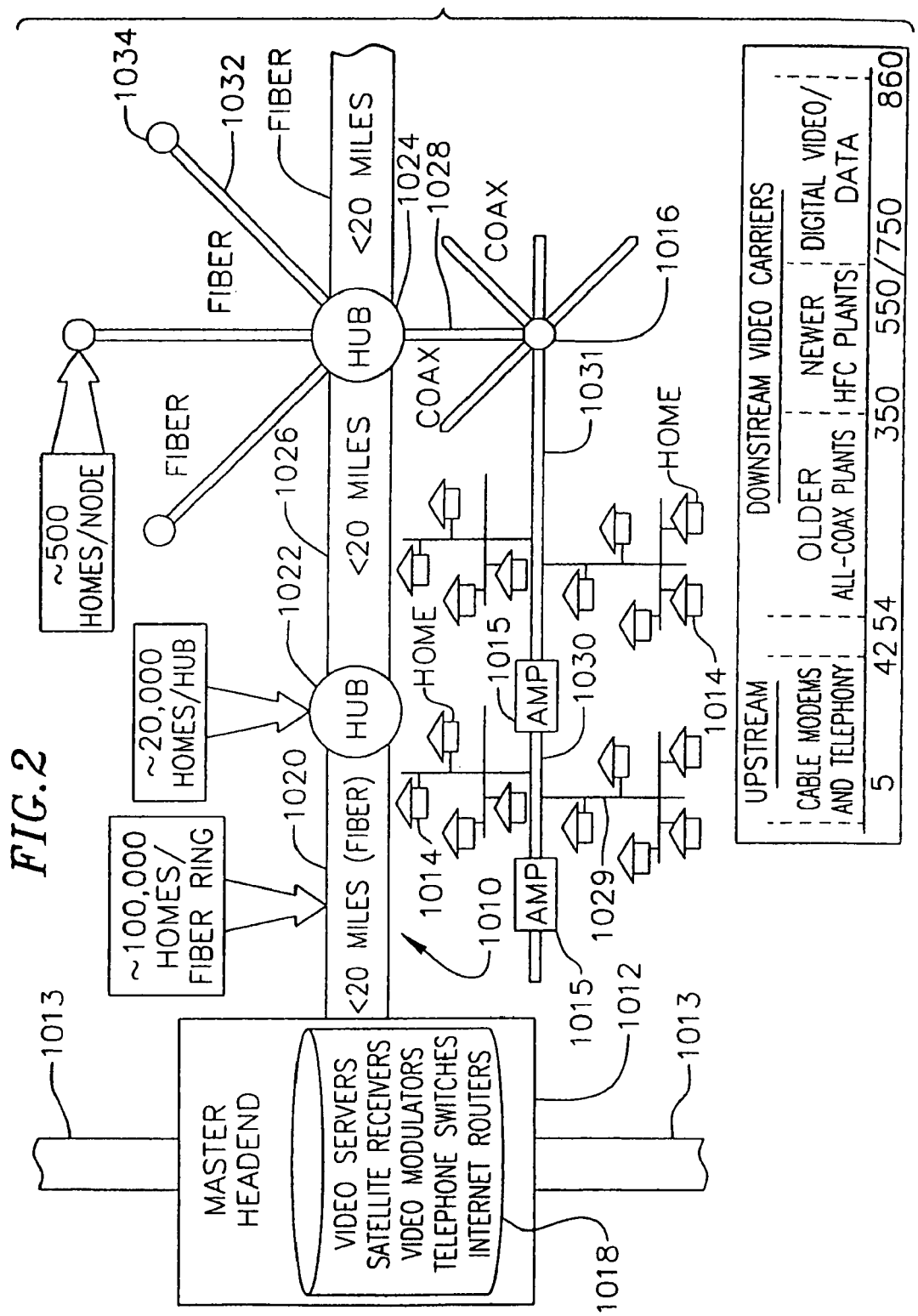
FIG. 2 is a schematic diagram of a hybrid fiber coaxial (HFC) network showing typical pathways for data transmission between the headend (which contains the cable modem termination system) and a plurality of homes (each of which contain a cable modem)

Referring now to FIG. 2, a hybrid fiber coaxial (HFC) network 1010 facilitates the transmission of data between a headend 1012, which includes at least one cable modem termination system, and a plurality of homes 1014, each of which contains a cable modem. Such hybrid fiber coaxial networks are commonly utilized by cable providers to provide Internet access, cable television, pay-per-view and the like to subscribers.

Approximately 500 homes 1014 are in electrical communication with each node 1016, 1034 of the hybrid fiber coaxial network 1010, typically via coaxial cables 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial cables 1030, 1031. Coaxial cable 1029 electrically interconnects the homes 1014 with the coaxial cables 1030, 1031, which extend between amplifiers 1015 and nodes 1016, 1034.

Each node 1016, 1034 is electrically connected to a hub 1022, 1024, typically via an optical fiber 1028, 1032. The hubs 1022, 1024 are in communication with the headend 1012, via optical fibers 1020, 1026. Each hub is typically capable of facilitating communication with approximately 20,000 homes 1014.

The optical fibers 1020, 1026 extending intermediate the headend 1012 and each hub 1022, 1024 defines a fiber ring which is typically capable of facilitating communication between approximately 100,000 homes 1014 and the headend 1012.

The headend 1012 may include video servers, satellite receivers, video modulators, telephone switches and/or Internet routers 1018, as well as the cable modem termination system. The headend 1012 communicates via transmission line 1013, which may be a T1 or T2 line, with the Internet, other headends and/or any other desired device(s) or network.

Figure 3:
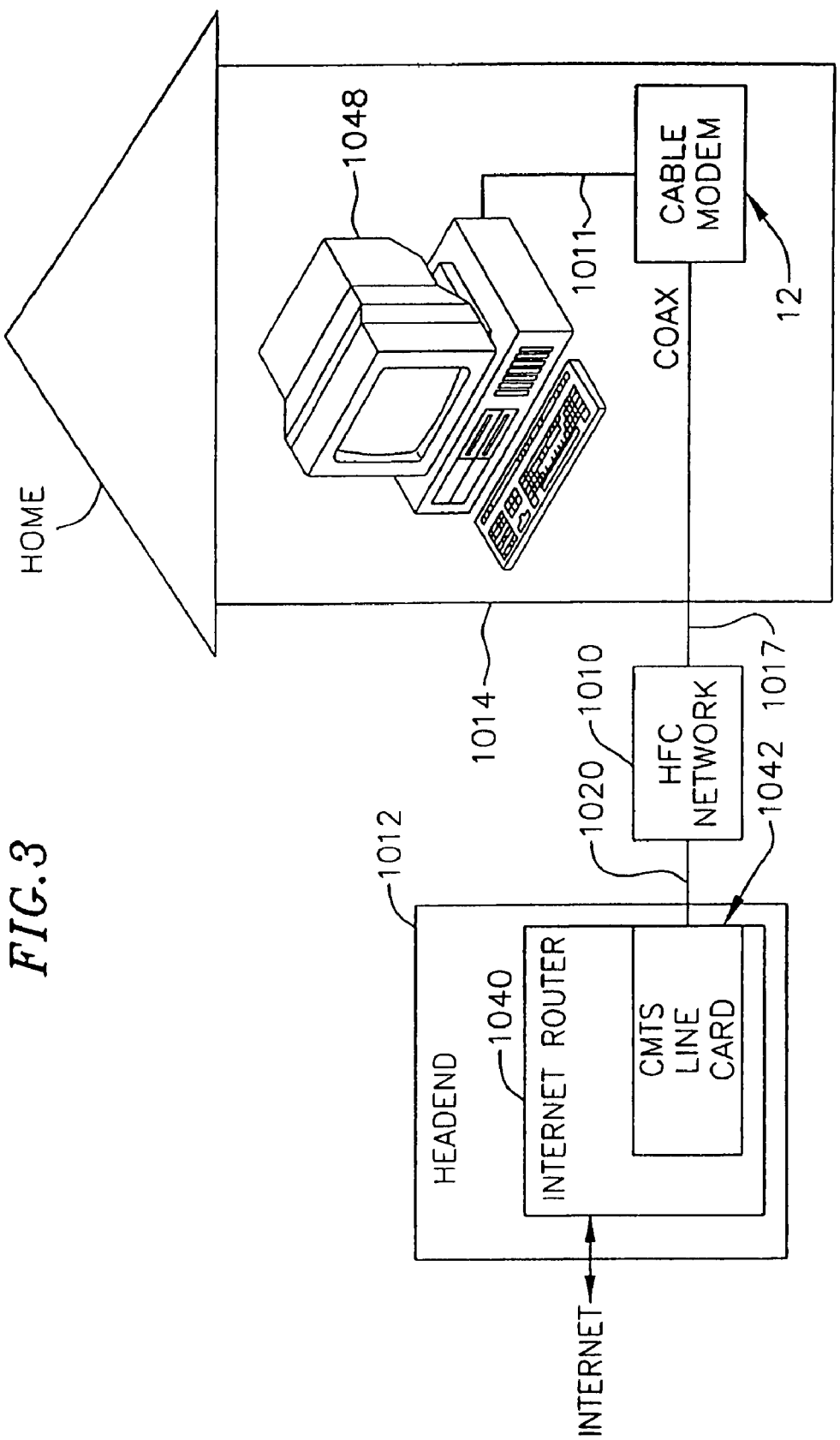
FIG. 3 is a simplified block diagram of a cable modem system wherein a line card which defines a cable modem termination system CMTS) is disposed at the headend and a cable modem is disposed within a representative home.

Referring now to FIG. 3, a simplified block diagram shows the interconnection of the headend 1012 and an exemplary home 1014, wherein a cable modem 12 communicates with a cable modem termination system, embodied as a line card 1042, via hybrid fiber coaxial network 1010.

More particularly, a personal computer 1048, disposed within the home 1014, is connected via cable 1011 to the cable modem 12 which communicates via coaxial cable 1017 with the hybrid fiber coaxial network 1010, which in turn communicates via optical fiber 1020 with the cable modem termination system (CMTS) including line card 1042 of the headend 1012. Internet router 1040 facilitates communication between the headend 1012 and the Internet or any other desired device or network.

In a typical cable modem system, a single cable modem termination system including line card 1042 (FIG. 3) will typically communicate with between 250 and 500 cable modems 12. Thus, the cable modem system of the present invention includes a plurality of cable modems 12. Although the following description generally discusses the operation of a single cable modem termination system including line card 1042 and a single cable modem 12, those skilled in the art will appreciate that a plurality of cable modem termination systems including line cards 1042 and cable modems 12 may similarly be utilized.

Figure 4A:
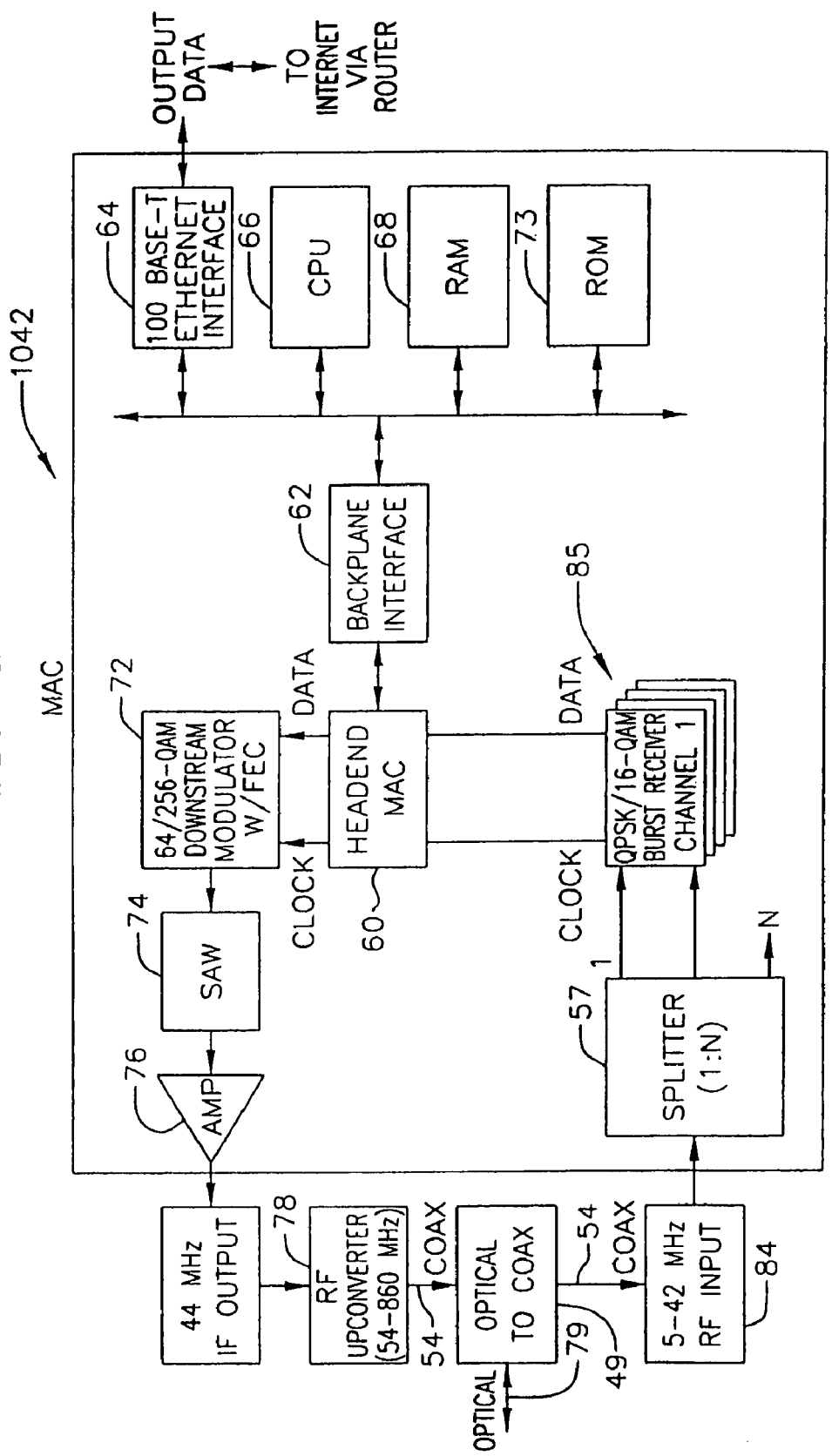
FIG. 4A is a schematic block diagram showing the interconnections of the burst receiver, medium access control (MAC) and transmitter downstream modulator within a cable modem termination system.

Referring now to FIG. 4A, the cable modem termination system including line card 1042 of FIG. 3 is shown in further detail. The cable modem termination system including line card 1042 is configured to receive signals from and transmit signals to an optical fiber 79 of the hybrid fiber coax (HFC) network 1010 (FIG. 2) via optical-to-coax stage 49, which is typically disposed externally with respect to the cable modem termination system including line card 1042. The optical-to-coax stage 49 provides an output to the 5-42 MHz RF input 84 via coaxial cable 54 and similarly receives a signal from the RF upconverter 78 via coaxial cable 54.

The output of the RF input 84 is provided to splitter 57 of the cable modem termination system including line card 1042, which separates the 5-42 MHz RF input into N separate channels. Each of the N separate channels is provided to a separate QPSK/16-QAM burst receiver channel 85.

Each separate QPSK/16-QAM burst receiver channel 85 is in electrical communication with the headend MAC 60. The headend MAC 60 is in electrical communication with backplane interface 62 which provides an interface to ROM 73, RAM 68, CPU 66, and 100BASE-T Ethernet interface 64.

The headend MAC 60 provides clock and a data output to the downstream modulator 72 which provides an output to amplifier 76 through surface acoustic wave (SAW) filter 74. Amplifier 76 provides an output to 44 MHz IF output, which in turn provides an output to the RF upconverter 78.

Each burst receiver 85 is configured so as to be capable of receiving both QPSK (4-QAM) or 16-QAM signals. The QPSK signals provide 2 bits per symbol, wherein each bit has ±1 amplitude levels. The 16-QAM signals provide 4 bits per symbol, each bit having a ±1 or ±3 amplitude level.

However, the description and illustration of a burst receiver configured to accommodate QPSK and 16-QAM inputs is by way of illustration only and not by way of limitation. Those skilled in the art will appreciate that other modulation techniques, such as 32-QAM, 64-QAM and 256-QAM may alternatively be utilized.

Figure 4B:
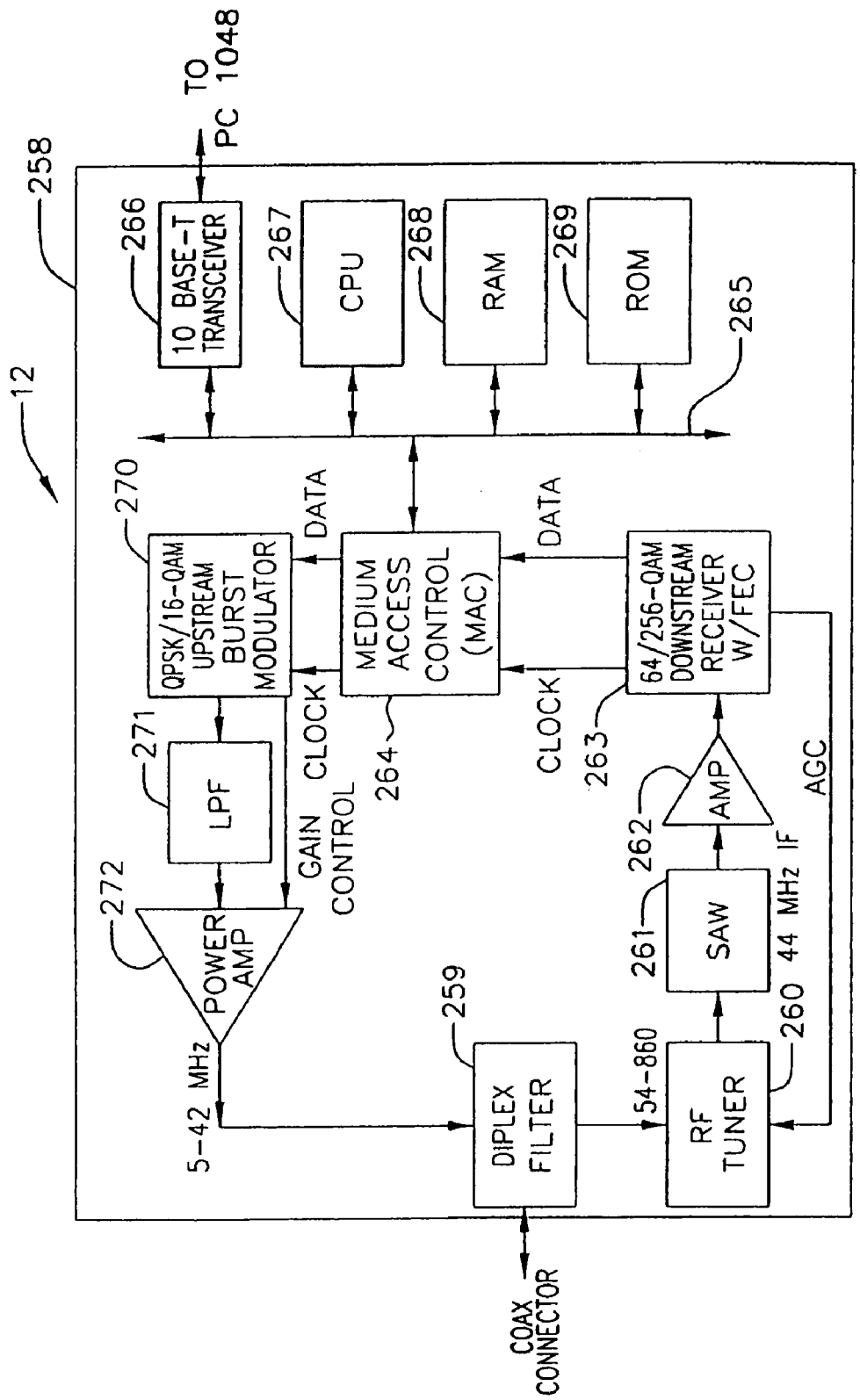
FIG. 4B is a schematic block diagram showing the construction of the cable modem, shown in FIG. 3, at the subscriber, such as a home.

The cable modem 12 in FIG. 3 is shown in detail in FIG. 4B within a rectangle 258. The system shown in FIG. 4B includes a diplex filter 259. The systems shown in FIGS. 4A and 4B can be combined into a single block diagram by rotating FIG. 4B through an angle of 180° so that the diplex filter 259 appears in inverted form at the right end and by then disposing the sheets adjacent each other.

The signals from the diplex filter 259 in the range of 54-860 MHz pass to an RF tuner 260 and then to a surface acoustic waver filter (SAW) 261 which provides signals at a suitable frequency such as approximately 44 MHz to an amplifier 262. The amplified signals pass to a 64/256-QAM downstream receiver 263 with forward error correction (FEC). Automatic gain controls are provided from the receiver 263 to the tuner 260. Clock and data signals then pass from the receiver 263 to a medium access controller (MAC) 264 which introduces signals through an interface 265 to individual ones of a 10 Base-T transceiver 266, a CPU 267, a random access memory (RAM) 268 and a read only memory (ROM) 269.

The signals from the individual ones of the 10 Base-T transceiver 266, the CPU 267, the RAM 268 and the ROM 269 pass through the interface 265 to the medium access controller (MAC) 264. The signals from the MAC controller 264 are then introduced to a QPSK-16QAM upstream burst modulator 270 with forward error correction. The signals from the burst modulator 270 are provided to a low pass filter 271 which passes signals in the range of 5-42 MHz when the system is used in North America. The low pass signals are then introduced to a power amplifier 272, the output from which is provided to the diplex filter 259. The gain in the power amplifier 272 is regulated by the burst modulator 270.

In order to provide an enhanced understanding of the invention, certain terminology used in this application will now be defined. A "MAP" is provided from the headend 10 to the subscriber modem 12. A MAP defines a next frame. A "frame" is a generic term to define a group or a multiple number of slots.

In a cable modem system, payloads or data packets contain information that is sent from the transmitter to the receiver. Included in the packet is a payload header, also called a data packet header, and a DOCSIS header. The data packet header contains information for directing the data packets to the proper location in the cable modem system.

DOCSIS introduced the concept of Payload Header Suppression (PHS). PHS allows a repetitive portion of certain payload headers (data packet headers) to be suppressed by the transmitter and expanded by the receiver, thereby reducing the amount of data transmitted over the cable network. The transmitter can be either the CM or the CMTS. This results in network bandwidth being conserved which helps maintain performance of the network. In the past, implementation of PHS was done entirely in software. However, it has been discovered that implementing PHS in hardware reduces the processing resource requirements in both the CM and the CMTS. Using hardware to suppress and expand the data packet header also overcomes the significant processing overhead associated with the software implementation of PHS, i.e., it conserves bandwidth on the HFC network.

An important application for PHS in hardware is to data packets carrying voice, since voice packets tend to be very small. The smaller a packet is, the greater the percentage of the header overhead. Suppressing the data packet header will require a smaller bandwidth when the information is transmitted. However, the scope of this invention is not limited to the suppression and expansion of the data packet headers of voice data packets. Those skilled in the art will appreciate that data packets headers in other types of data packets may be suppressed and expanded without departing from the spirit and scope of this invention.

PHS rules are used to determine whether bytes in a data packet header are to be suppressed. A PHS rule, or simply a rule, is an instruction for a particular SID that is defined by the DOCSIS specification. The SID defines the type of service flow being used. The service flow is an indicator on where the data packet is directed and the quality of service that has been purchased by the subscriber. The rule contains the number of suppressed bytes, a mask that indicates which bytes are to be suppressed and the string of the suppressed bytes. The rule is not only used at the transmission end, but at the receiving end as well, so that the string of suppressed bytes can be reinserted into the proper location of the data packet header.

The rules are determined by the CMTS and transmitted to the CM. The CM must retain all rules sent to it by the CMTS. To simplify accessing rules by hardware, firmware stores rules in CM memory using a table of descriptors and string buffers. Descriptors contain part of the rule, namely the number of suppressed bytes and the mask, and a pointer to find the string buffer, where the remainder of the rule, namely the string, is stored. The pointer is set to the address of a buffer in external memory where the string of suppressed bytes is stored. The suppressed bytes will be reinserted during the expansion process. Firmware allocates and initializes the table of descriptors in the external memory of the system. The table is created for as many descriptors as are required for the rules and service flows that have to be handled. There is a separate descriptor for each defined rule.

The descriptor consists of 16 bytes. Table 1, shown below, illustrates how the 16 bytes of the descriptor are allocated. The first byte of the descriptor designates the size field. This indicates the number of bytes that require suppression at the transmitter and expansion at the receiver. The next three bytes are reserved for future use and the four subsequent bytes are used for the pointer. The pointer is set to the address of the buffer where the string of suppressed bytes is stored. The final eight bytes are used for the mask. The mask contains 64 bits which indicate which bytes of the data packet header require suppression.

TABLE 1

| PHS Descriptors | | |
| --- | --- | --- |
| 1 byte | size | Number of suppressed bytes to be inserted into the data packet (size = 0 implies no PHS) |
| 3 bytes | Reserved (must be 0) | Reserved for future use |
| 4 bytes | pointer | Address of corresponding buffer containing compacted string of suppressed bytes |
| 8 bytes | mask | 64 bit mask indicating the position of the suppressed bytes |

DOCSIS defines a size field of up to 256 bytes that can be suppressed; however this hardware implementation only supports suppression of 64 bytes. Suppressed bytes occurring beyond the $64^{th}$ byte are handled by software. The value of the size field determines whether suppression occurs in hardware or software. If the size field is 0, then no suppression or expansion will occur. The data packet header remains unchanged and is transmitted over the cable network. Upon arrival at the receiver, the data packet header bypasses the expansion logic. If the size field is greater than 0 but less than 64, suppression or expansion occurs in hardware. If the size field is greater than 64, then suppression or expansion occurs in software. In this case, hardware does not alter the packet. Only bytes that are static can be suppressed, bytes in the data packet header that change from packet to packet cannot be suppressed.

The size field is determined by the number of static bytes that can be suppressed. Although the quality of service for the service flow may influence whether the CMTS chooses to suppress payload headers or not, it does not dictate how many bytes are suppressed. Once the decision is made to suppress the payload header, as many bytes are suppressed as practical.

Figure 5:
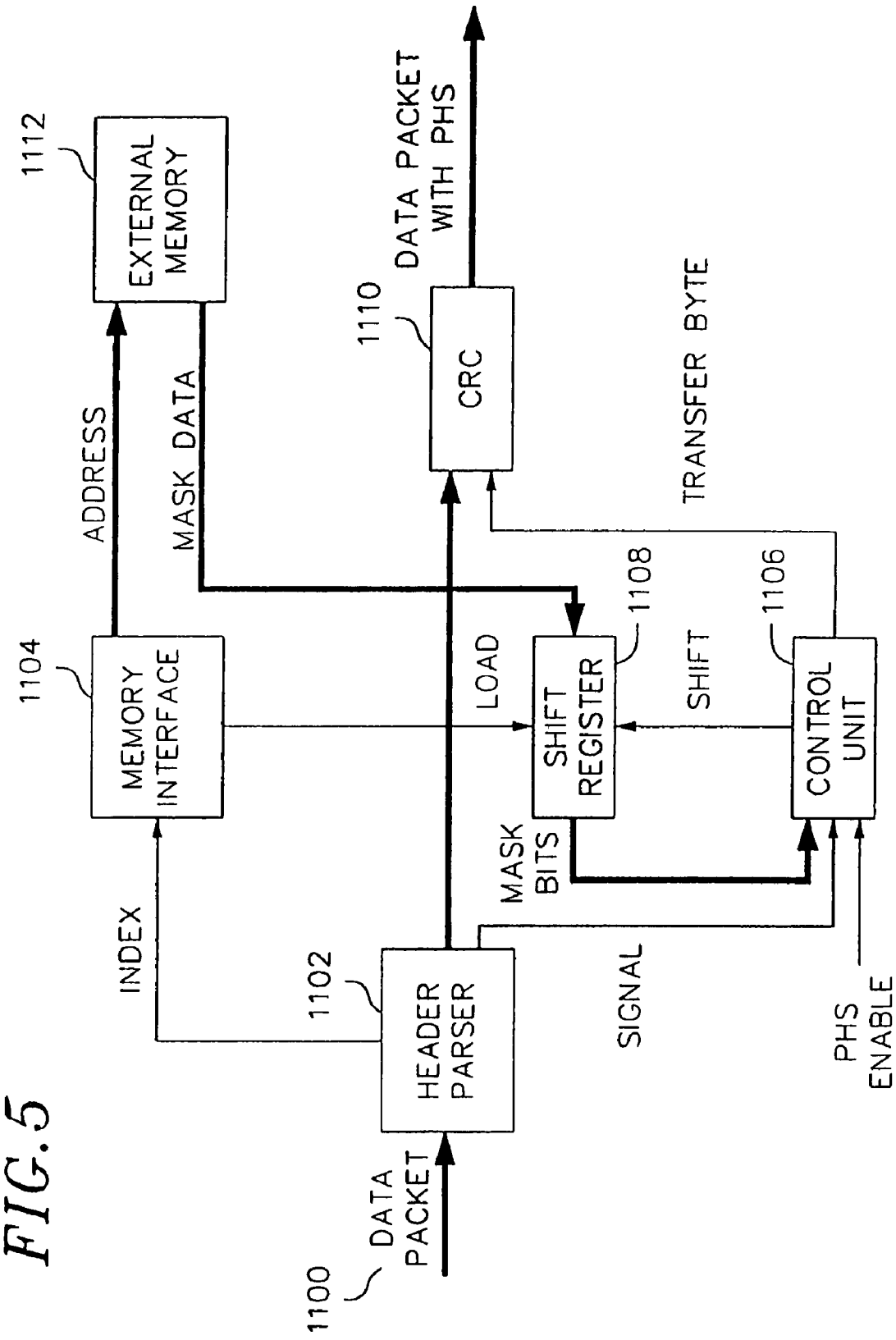
FIG. 5 is a simplified block diagram showing the implementation of Payload Header Suppression.

FIG. 5 illustrates the hardware architecture of the system to implement DOCSIS PHS. PHS is implemented at the transmitter, i.e., the downstream section of the CMTS and the upstream section of the CM. The CMTS suppresses bytes from the payload header before transmission. (The concept of the descriptor is implementation specific and may not be used by the CMTS.) An extended header element is added to the DOCSIS extended header of the data packet. This occurs at the CMTS during build up. The extended header element contains an index to the descriptor that is appropriate for the particular service flow. A copy of the rule must already have been sent to the receiver for use during expansion. The described hardware architecture is applicable for both the CMTS and CM to suppress header bytes.

A block diagram of the PHS implementation is shown in FIG. 5. The added extended header element contains the index that is used, along with the SID, to locate the appropriate descriptor from the table of descriptors stored in external memory 1112. Then the data packet 1100, before encryption, passes through the header parser 1102. It is clocked through the header parser 1102 by the system's master clock. Logic in the header parser 1102 maintains framing on the data packet and watches for the extended header element. If an extended header element is found in the data packet, the index in this extended header element is passed from the header parser 1102 to the memory interface 1104 and the control unit 1106 is signaled by the header parser 1102 to indicate the beginning of transmission of the data packet 1100. The memory interface 1104 uses the index and SID to form the address in external memory 1112 where the descriptor is stored. The mask data part of the descriptor retrieved from memory 1112 is transferred to the shift register 1108 responsive to a load command from memory interface 1104 and is used in control unit 1106 to determine which bytes of the data packet header should be suppressed.

When the control unit 1106 is signaled, the first bit of the mask stored in shift register 1108 is sent to control unit 1106. Logic in control unit 1106 examines the first bit of the mask. If the value of the first bit in the mask is 1, the first byte in the data packet header is suppressed, i.e., discarded. If the value of the first bit in the mask is 0, the first byte in the data packet header is transferred by the control unit 1106 to the Cyclic Redundancy Code (CRC) generator 1110. After the first byte in the data packet header has been so processed by the control unit 1106, the control unit 1106 sends a shift command signal to the shift register 1108 indicating that the next bit in the mask should be sent to control unit 1106. As a result, the mask is shifted once and the value of the second mask bit is sent to control unit 1106. As with the first mask bit, if the second mask bit has a value of 1, the second byte of the data packet header is suppressed. If the second mask bit has a value of 0, the second byte of the data packet header is transferred to the CRC generator 1110. In the described manner, the mask bits are shifted one at a time from register 1108 to control unit 1106 to either suppress or pass to CRC generator 1110 the corresponding byte of the header. The number in the size field indicates the number of times this process is repeated. When all the bits in the mask have been examined, the control unit 1106 transfers all remaining bytes of the data packet 1100 to the CRC generator 1110 for coding. The bytes of the data packet 1100 that go to the CRC generator 1110 are inserted with a code. This code is used for error detection and correction of the data packet upon arrival at the receiver to insure that all bytes were accurately transmitted. The CRC generator 1110 operates only on unsuppressed header bytes. This header suppression operation is performed on the fly as the data packets are being received.

If no extended header element was found, or if PHS was not enabled, the control unit 1106 is not activated and all bytes of the data packets pass directly from the header parser 1102 to the CRC generator 1110. In this case, no descriptor is fetched from external memory 1112. The CRC generator 1110 calculates the CRC over the data packet and appends the CRC value to the end of the packet. Data then goes out of the PHS section for further processing. The header parser 1102 signals to control unit 1106 the end of the data packet to reset the suppression logic for the next data packet.

Figure 6:
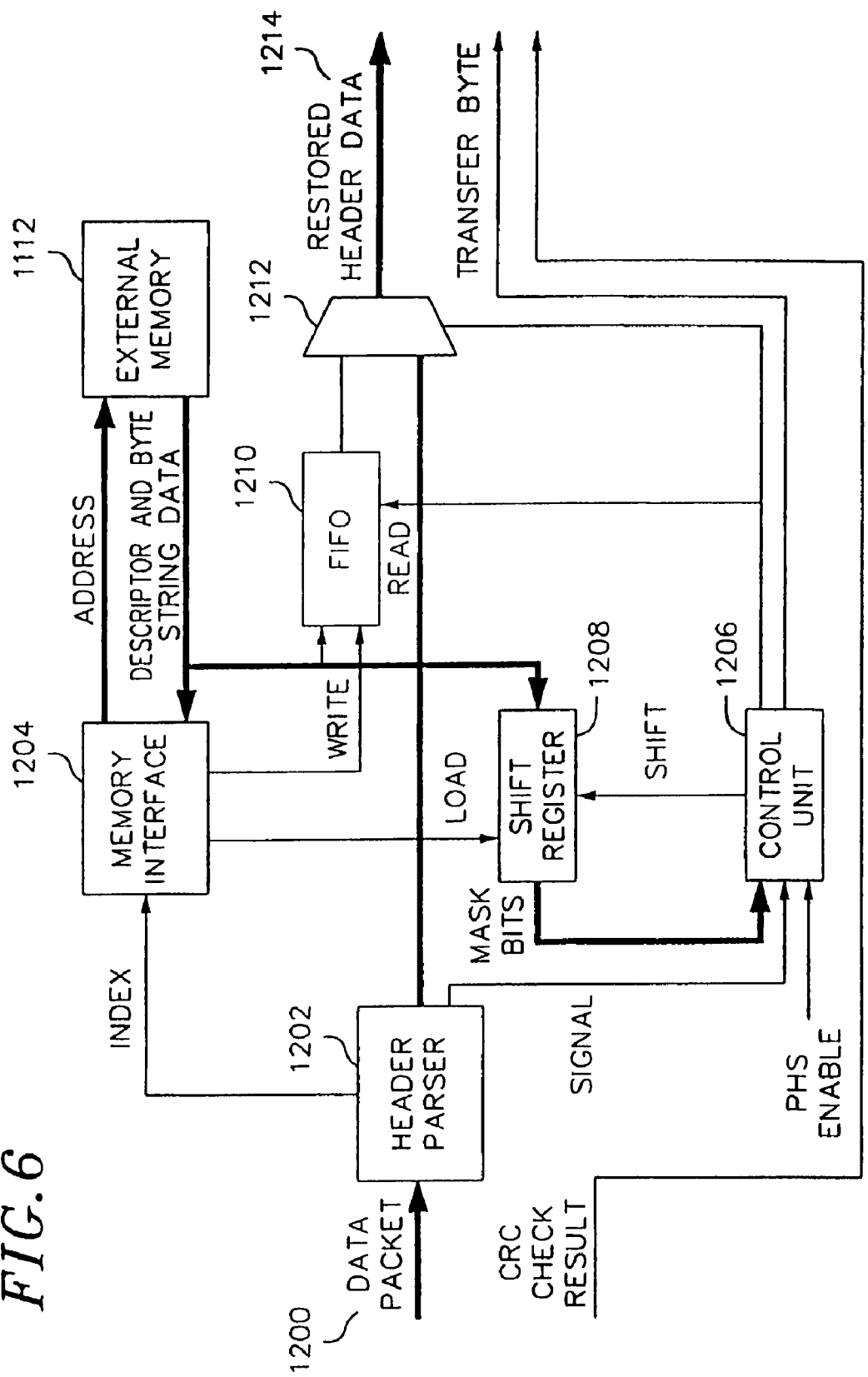
FIG. 6 is a simplified block diagram showing the implementation of Payload Header Expansion.

FIG. 6 illustrates the hardware architecture to perform the inverse of payload header suppression, Payload Header Expansion. Payload Header Expansion reinserts the bytes at the receiver that were suppressed at the transmitter. It is implemented at the upstream section of the CMTS and the downstream section of the CM. The same rule exchange that defined the suppression of bytes at the transmitter also defines expansion at the receiver. The described architecture is applicable for both the CMTS and CM to expand data packet header bytes.

Firmware at the CMTS or CM stores the strings of suppressed bytes in a buffer stored in external memory 1112 which is accessible by hardware. The hardware implements a memory interface 1204 that is able to fetch these values on an as needed basis using the index and SID from the extended header element to form the address in external memory where the descriptor is located.

A block diagram is shown in FIG. 6. The data packet 1200, after decryption and CRC checking, passes through the header parser 1202. It is clocked through the header parser 1202 by the system's master clock. Logic in this block maintains framing on the data packet 1200 and watches for the extended header element. If one is found, the index contained in it is passed to the memory interface 1204 and the control unit 1206 is signaled. The memory interface 1204 uses the index and SID to locate the appropriate descriptor from the table of descriptors stored in external memory 1112. The mask data part of the descriptor retrieved from memory 1112 is transferred to the shift register 1208 responsive to a load command from memory interface 1204 and is used in control unit 1206 to determine which bytes of the data packet header should be reinserted into the header. The size and pointer fields of the descriptor are used to fetch the string of suppressed bytes from the buffer stored in external memory 1112. Responsive to write commands from memory interface 1204, the fetched string of suppressed bytes is transferred from external memory 1112 to a holding FIFO 1210. Data is shifted out of FIFO 1210 responsive to read commands from control unit 1206; this data is fed to one input of a multiplexer 1212 so it can be inserted back into the header. The suppressed data packet is fed from header parser 1202 to a second input of multiplexer 1212. Control unit 1206 sends a control signal to multiplexer 1212 so either the input from FIFO 1210 or the input from header parser 1202 is selected for transmission to the output of multiplexer 1212, constitutes the restored or expanded header data.

When a header having the PHS extended header element (see FIG. 1) is received, the header parser 1202 signals the control unit 1206 to indicate the beginning of the data packet 1200 coming from the cable network. The control unit 1206 sends a shift command to the shift register 1208 indicating that the first mask bit should be examined. The first mask bit is then sent from shift register 1208 to control unit 1206. If the first mask bit contains a value of 1, the corresponding byte of the fetched string of suppressed bytes currently being stored in the FIFO 1210 is inserted into the data packet header 1200 by means of multiplexer 1212. Specifically, the control unit 1206 sends a read command signal to the FIFO 1210 to send the corresponding bit string to one input of multiplexor 1212 and a control signal to multiplexer 1212 to select the bit string at the one input of multiplexer 1212 for transmission to the output of multiplexer 1212. If the first mask bit contains a value of 0, the control unit 1206 sends a control signal to multiplexer 1212 to select the suppressed data packet at the other input of multiplexer 1212 for transmission to the output of multiplexer 1212. Control unit 1206 then sends a shift command to shift register. As a result, the mask is then shifted once and the second mask bit is examined. Depending on the value of the second mask bit one or the other of the inputs to multiplexer 1210 is transmitted to its output and the next mask bit is shifted. In the described manner, the mask bits are shifted one at a time from register 1208 to control unit 1206 to either transmit a suppressed bit string from FIFO 1210 or the unsuppressed portion of the header from parser 1202 to the output of multiplexer 1212. The number in the size field indicates the number of times this process is repeated.

When all bits in the mask have been examined, the control unit 1206 transfers all remaining bytes of the data packet 1200 by selecting for transmission the input of the multiplexor 1212 that is connected to header parser 1202. Once the header parser detects the last byte in the header, it notifies control unit 1206, which generates a transfer byte signal.

If no extended header element is found, or if PHS is not enabled, the control unit 1206 passes all bytes and the memory interface 1204 does not fetch a descriptor. The CRC check result is passed through the expansion logic. The header parser signals the end of the packet which resets the expansion logic in control unit 1206 for the next packet.

Figure 7:
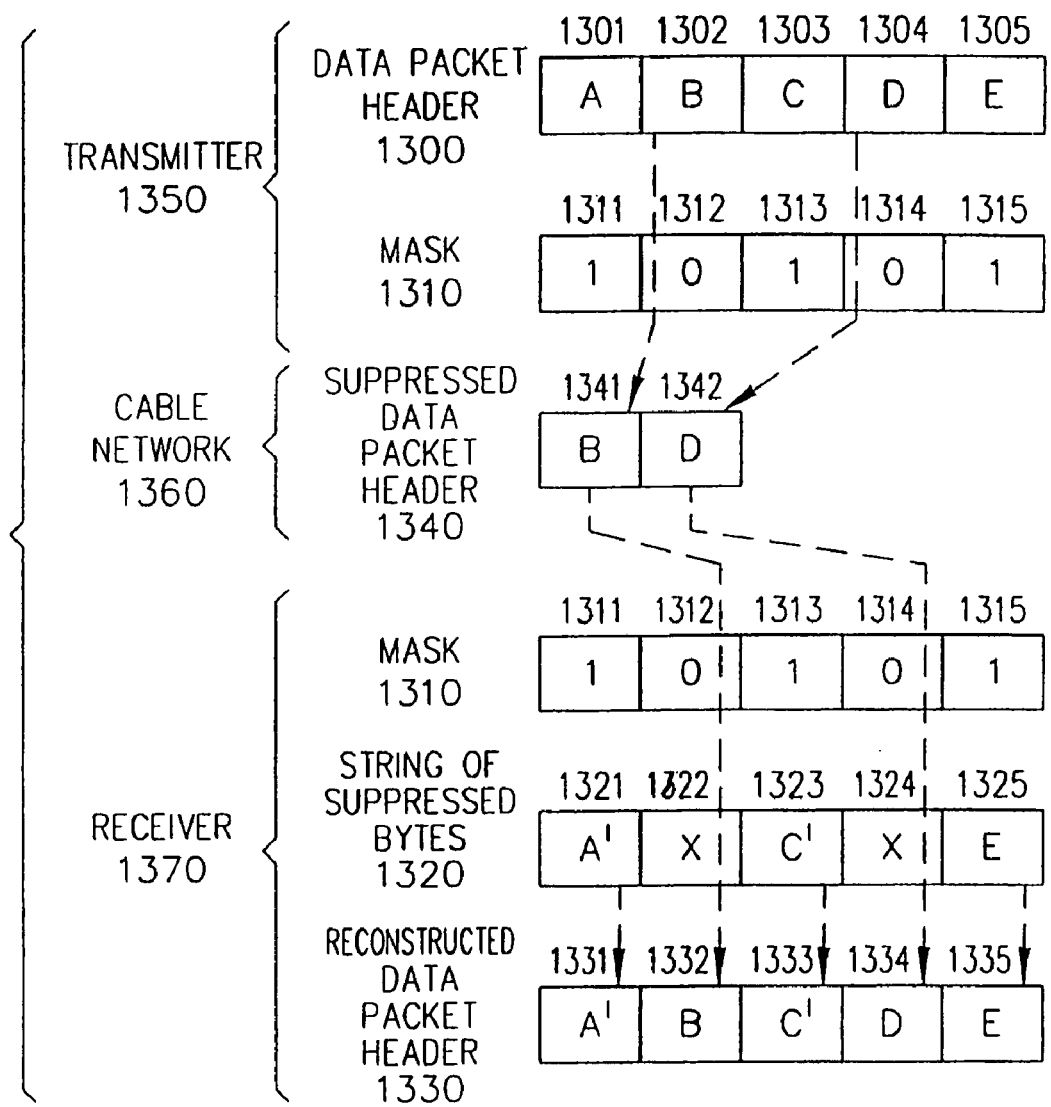
FIG. 7 illustrate packet suppression and expansion implementing PHS masking.

Referring now to FIG. 7, an example of suppressing and expanding a data packet header using a mask 1310 is illustrated. Each of the bits of the mask 1310 contains information indicating whether the corresponding byte in the data packet header 1300 requires suppression. The mask 1310 is established in external memory by firmware. When bytes require suppression, the hardware retrieves the mask 1310 from a descriptor in external memory. The mask is part of the rule. Rules are determined by the CMTS and transmitted to the CM before expansion or suppression is enabled.

Each bit of the mask 1310 corresponds to a byte in the data packet header 1300. FIG. 7 illustrates a data packet header 1300 containing five bytes, A 1301, B 1302, C 1303, D 1304 and E 1305, that require transmission over the cable network 1360 to the receiver 1370. The bits in the mask 1310 are shifted one at a time and examined to determine the value. The first byte in the data packet header 1300 is byte A 1301. Byte A 1301 corresponds to the first bit 1311 of the mask which has the value of 1. The value 1 in the mask indicates to the transmitter 1350 that this byte 1301 requires suppression before transmission of the suppressed data packet header 1340 over the cable network 1360. The second byte B 1302, corresponds to the second bit 1312 in the mask 1310 which has a value of 0. The value 0 in bit 1312 of the mask 1310 indicates to the transmitter that this byte 1302 does not require suppression and is transmitted over the cable network 1360 to the receiver 1370. The third byte in the data packet header 1300 is byte C 1303. Byte C 1303 corresponds to the third bit 1313 of the mask 1310, which has a value of 1 so the byte is suppressed. The fourth byte in the data packet header is byte D 1304. Byte D 1304 corresponds to fourth bit 1314 of the mask 1310, which has a value of 0 so the byte is not suppressed. Lastly, the fifth byte in the data packet header is E 1305. Byte E 1305 corresponds to the fifth bit 1315 of the mask 1310, which has a value of 1 so the byte is suppressed. As a result, only bytes B 1302 and D 1304 are transmitted over the cable network to the receiver 1370, while bytes A 1301, C 1303 and E 1305 are suppressed. By only transmitting bytes B 1302 and D 1304, a smaller bandwidth is utilized and this also reduces the processing resource requirements in both the CM and the CMTS. This improves overall performance of the system and allows a larger number of CMs to be serviced by a single CMTS.

Upon bytes B 1302 and D 1302 arriving at the receiver 1370, the same mask 1310 is again utilized to indicate where the bytes, which have been removed and suppressed from the data packet header 1300, require reinsertion. This procedure is accomplished by shifting the mask 1310 one bit at a time for examination. When the bit contains the value 1, hardware retrieves a byte from the string of suppressed bytes 1320 in memory, and reinserts it back into the reconstructed data packet header 1330. The first bit 1311 of the mask is examined. This bit contains a value of 1 indicating that the corresponding byte in the data packet header 1300 was suppressed. Since this byte was suppressed, the first byte A' 1321 in the string of suppressed bytes 1320, is retrieved and inserted into the reconstructed data packet header 1330. The mask 1310 is then shifted once and bit 1312 is examined. The 0 indicates that the corresponding byte 1322 in the data packet header 1300 was not suppressed and byte B 1341 is then retrieved from the suppressed data packet header 1340 that has been received over the cable network 1360. The mask 1310 is shifted again and bit 1313 is examined. As can be seen in FIG. 7, bit 1313 has a value of a 1, so the hardware retrieves the next byte, C' 1333, from the string of suppressed bytes 1320 and reinserts it after byte B 1332 in the reconstructed data packet header 1330 at the receiver 1360. The mask 1310 is shifted again and bit 1314 is examined. The bit 1314 has a value of 0, so byte D 1342 is acquired from the suppressed data packet header 1340 that was transmitted over the cable network 1350. The mask 1310 is shifted again so the final bit 1315 can be examined. The final bit 1315 has a value of 1, so byte E' 1325 is reinserted back into the reconstructed data packet header 1330 at the receiver 1360. The reconstructed data packet header 1330, containing the values A' 1331, B 1332, C' 1333, D 1334 and E' 1335, is then stored in memory for the software to use. Bytes 1322 and 1324 of the string of suppressed bytes are indicated with the value X. This indicates that the corresponding bytes in the data packet header were not suppressed.

Figure 8:
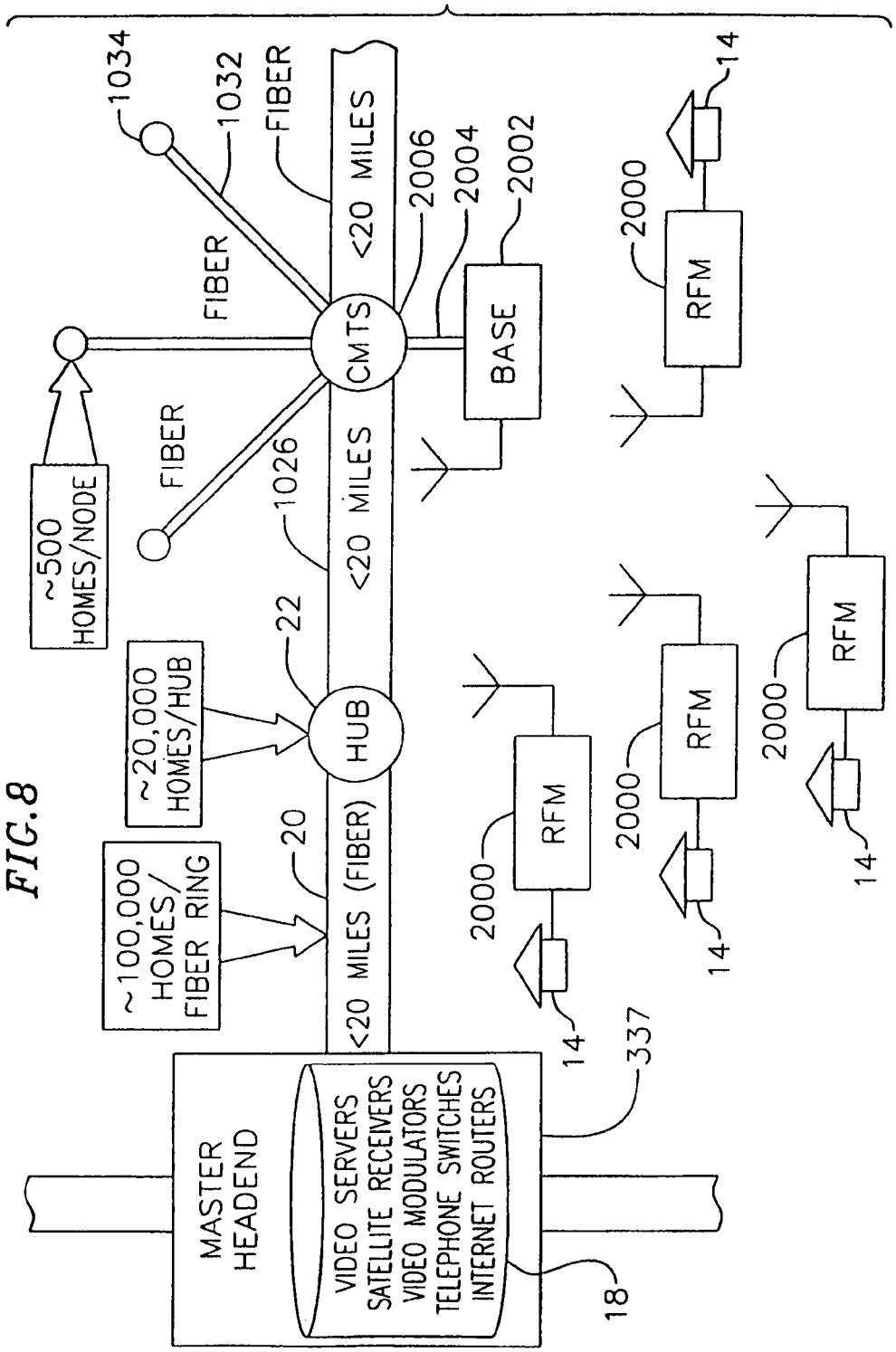
FIG. 8 is a modification of FIG. 2 adapting the invention to wireless transmission.
Figure 9:
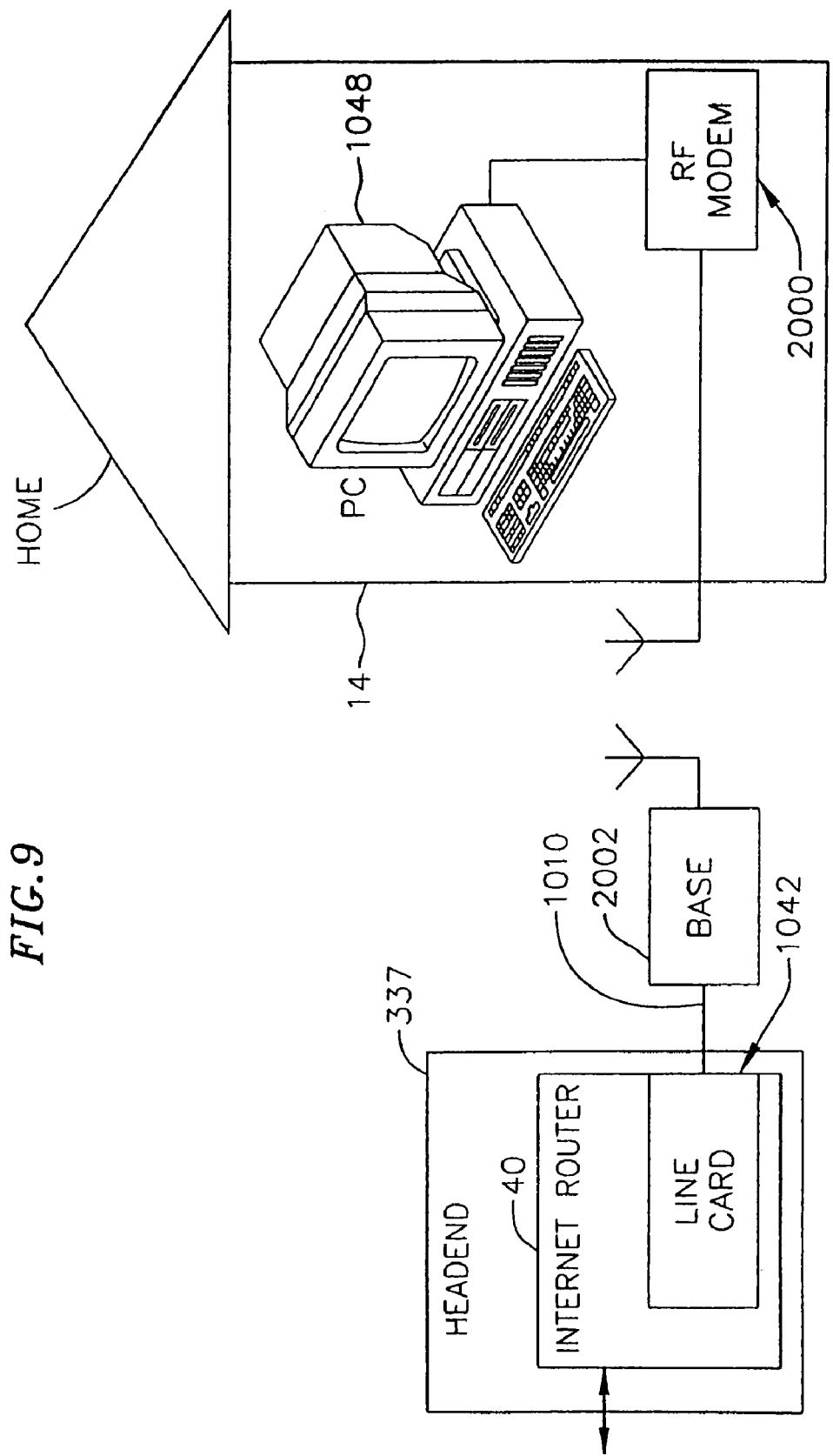
FIG. 9 is a modification of FIG. 3 adapting the invention to wireless transmission.

Reference is now made to FIGS. 8 and 9 for a description of another embodiment of the invention. In this embodiment, there are wireless transmission links between homes 14 and HFC network 1010. Each of homes 14 is equipped with radio frequency modem (RFM) 2000. A base station 2002 is in wireless RF contact with RFM's 2000. The wireless architecture is similar to a cellular phone system. Code division multiple access (CDMA) transmission could be used between RFM's 2000 and base station 2002. Base station 2002 is connected by a fiber 2004 to a CMTS hub 2006. Hub 2006 is part of HFC network 1010. Otherwise the components in FIGS. 8 and 9 are the same, and bear the same reference numerals, as those described in connection with FIGS. 2 and 3. As illustrated in FIG. 8, CMTS hub 2006 can be integrated in the same cable system that also services CM's connected by fiber to hub 22. Thus, upstream and/or downstream channels can be installed in a home without physically laying cable all the way to the home. If desired, the downstream channel could be fiber because of the large bandwidth requirement, and the upstream channel could be wireless because there is a smaller bandwidth requirement.

Figure 10:
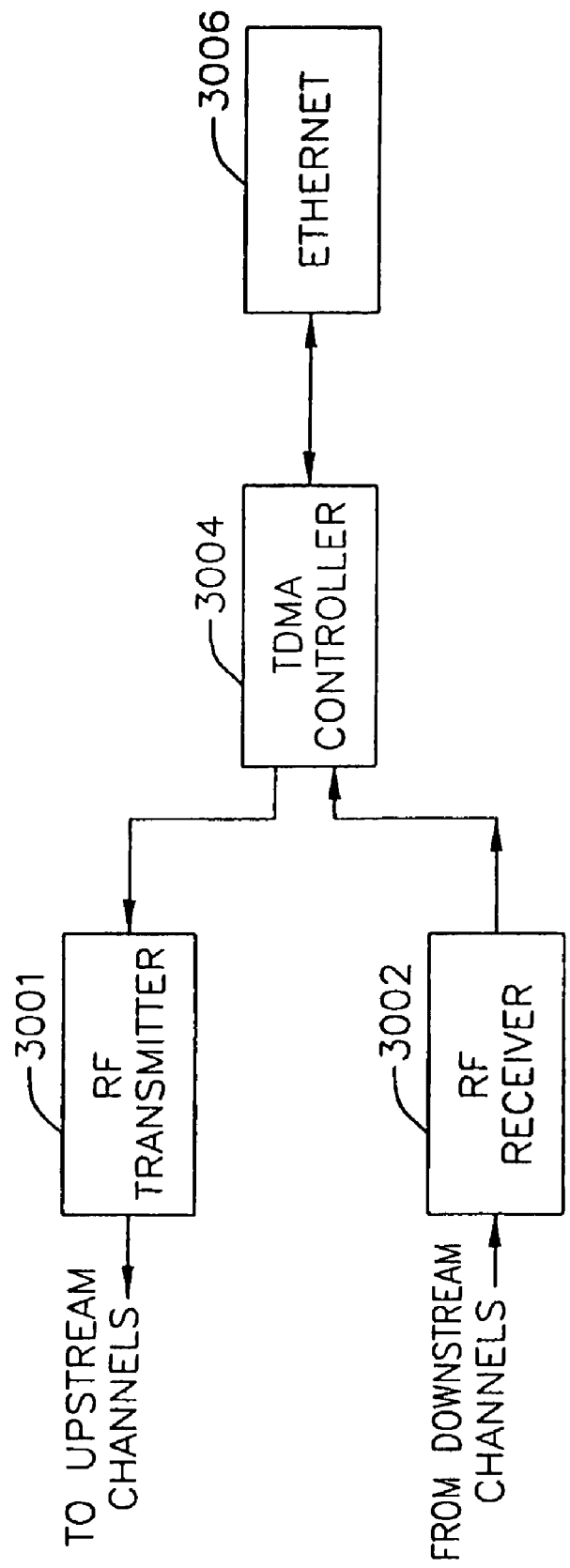
FIG. 10 is a schematic diagram of a single integrated circuit chip adapted to practice the invention.

The described functions of cable modems 1046 and RF modems 2000 could be carried out on a single integrated circuit chip as illustrated in FIG. 10. In this chip the output of an RF transmitter 3001 feeds the upstream channels of HFC network 1010. The downstream channels of HFC network 1010 feed the input of an RF receiver 3002. A time division multiple access (TDMA) controller 3004 is connected to the input of the transmitter. The output of receiver 3002 is connected to TDMA controller 3004. An Ethernet 3006 serves as an interface between TDMA controller 3004 and a PC or other binary signal processing device. TDMA controller 3004 could be an application specific circuit or a microprocessor programmed to perform the described CMTS functions, including fragmentation. It is understood that the exemplary data packet fragmentation described herein and shown in the drawings represents only presently desired embodiments of the invention. Indeed, various modifications and additions may be made to such embodiments without departing from the spirit and scope of the invention. For example, requests to transmit data from cable modems need not be received by the cable modem termination system and the MAP need not be generated by the cable modem termination system, but rather requests may be received by an autonomous device, which operates independently of the cable modem termination system, and the MAPs may be generated by this or another autonomous device. Thus, these and other modifications and additions may be obvious to those skilled in the art and may be implemented to adapt the present invention for use in a variety of different applications. The described fragmentation capability can be enabled or disabled in the cable modems on a selective basis. Specifically, when a cable modem transmits a registration message to the CMTS at the time that the cable modem enters service, the acknowledging response of the CMTS includes a signal that either enables or disables fragmentation. If fragmentation is enabled, the cable modem and the CMTS operate as described above to fragment data to be transmitted upstream. If fragmentation is disabled, the cable modem only transmits data to the headend if the granted amount of bandwidth is the same as or larger than the bandwidth required to transmit the data. Alternatively, if fragmentation is disabled, the CMTS only transmits a grant if the requested bandwidth is the same as or smaller than the bandwidth available for transmission to the headend.

The described embodiments of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. In hardware of a wireless communication system, a method for suppressing and expanding a data packet header contained in a data packet, the method comprising:

adding an extended header element to the data packet, the extended header element containing an index used in combination with an identifier to locate a rule that determines how the data packet header is to be suppressed;

suppressing the data packet header using the rule to provide a suppressed data packet header;

transmitting the data packet and the suppressed data packet header; and expanding the suppressed data packet header by reading the index and using the corresponding rule, wherein a first wireless device uses the rule, which defines a mask describing which bytes of the data packet header are to be suppressed, and transmits information indicative of information contained in the rule to at least one second wireless device.

2. The method of claim 1, wherein the first wireless device is a base station, and wherein the at least one second wireless device includes at least one subscriber station.

3. The method of claim 1, wherein the first wireless device is a subscriber station, and wherein the at least one second wireless device includes a base station.

4. In hardware of a wireless communication system, a method for suppressing and expanding data packet headers contained in a data packet, the method comprising:

adding an extended header element to the data packet, the extended header element containing an index to a descriptor which locates a rule that determines how the data packet header is to be suppressed, the rule being determined by a service flow;

suppressing the data packet header to provide a suppressed data packet header;

transmitting the data packet and suppressed data packet header;

receiving the data packet and suppressed data packet header; and expanding the suppressed data packet header by reading the index and using the corresponding rule, wherein a first wireless device uses the rule which defines a mask describing which bytes of the data packet header are to be suppressed, and the first wireless device transmits information indicative of the rule to at least one second wireless device.

5. The method of claim 4, wherein the first wireless device is a base station, and wherein the at least one second wireless device includes at least one subscriber station.

6. The method of claim 4, wherein the first wireless device is a subscriber station, and wherein the at least one second wireless device includes a base station.

7. In hardware of a medium access control (MAC) of a wireless communication device, a method for suppressing a data packet header contained in a data packet, the method comprising:

adding an extended header element to the data packet, the extended header element containing an index to a descriptor which locates a rule that determines how the data packet header is to be suppressed for a given service flow, wherein the rule defines a size field indicating the number of suppressed bytes, a mask indicating the location of the suppressed bytes, and a string containing the suppressed bytes.

8. In hardware of a medium access control (MAC) of a wireless communication device, a method for suppressing a data packet header contained in a data packet, the method comprising:

adding an extended header to the data packet, the extended header containing an index to a descriptor which locates a rule that determines how the data packet header is to be suppressed, the rule generally defining which bytes of the data packet header are to be suppressed, for a given service flow, wherein the rule defines a size field indicating the number of suppressed bytes, a mask indicating the location of the suppressed bytes, and a string containing the suppressed bytes.

9. In a medium access control (MAC) of a wireless communication device, a method of suppressing a data packet header included in a data packet using hardware, the method comprising:

receiving a data packet that includes an extended header element;

generating an address based on the extended header element and an identifier;

retrieving a descriptor from a memory based on the address; and determining which bytes of the data packet are to be suppressed based on the descriptor.

10. The method of claim 9, wherein generating the address is performed based on the identifier and an index that is included in the extended header element.

11. The method of claim 10, further comprising:

transmitting the data packet with the bytes that are indicated by the descriptor being suppressed.

12. The method of claim 9, wherein the descriptor includes a size field to indicate a number of bytes included in the data packet and a mask to indicate which bytes of the data packet are to be suppressed.

13. The method of claim 9, further comprising:

transmitting unsuppressed bytes of the data packet using a cyclic redundancy code (CRC) generator.

14. The method of claim 9, wherein receiving the data packet includes receiving the data packet at a base station MAC.

15. The method of claim 9, wherein receiving the data packet includes receiving the data packet at a subscriber station MAC.

16. In a medium access control (MAC) of a wireless communication device, a method of expanding a data packet header included in a data packet using hardware, the method comprising:

receiving a data packet that includes an extended header element;

generating an address based on the extended header element and an identifier;

retrieving a descriptor from a memory based on the address; and determining which of an unsuppressed byte or a suppressed byte is to be transmitted based on the descriptor.

17. The method of claim 16, wherein generating the address is performed based on the identifier and an index that is included in the extended header element.

18. The method of claim 17, further comprising:

transmitting the data packet having suppressed bytes replaced by corresponding unsuppressed bytes.

19. The method of claim 16, further comprising:

combining at least one suppressed byte and the data packet received by the header parser to provide an expanded data packet based on the descriptor.

20. The method of claim 19, wherein the descriptor includes a size field to indicate a number of bytes included in the expanded data packet and a mask to indicate where suppressed bytes are to be included in the expanded data packet.

21. The method of claim 16, wherein receiving the data packet includes receiving the data packet at a base station MAC.

22. The method of claim 16, wherein receiving the data packet includes receiving the data packet at a subscriber station MAC.

* * * * *